United States Patent
Ledet

(10) Patent No.: US 10,521,610 B1
(45) Date of Patent: Dec. 31, 2019

(54) DELIVERING SECURE CONTENT IN AN UNSECURE ENVIRONMENT

(71) Applicant: OPEN INVENTION NETWORK LLC, Durham, NC (US)

(72) Inventor: David Gerard Ledet, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 281 days.

(21) Appl. No.: 15/615,967

(22) Filed: Jun. 7, 2017

Related U.S. Application Data

(60) Provisional application No. 62/347,131, filed on Jun. 8, 2016.

(51) Int. Cl.
*H04L 29/06* (2006.01)
*G06F 21/62* (2013.01)
*G06F 21/78* (2013.01)

(52) U.S. Cl.
CPC ...... *G06F 21/6263* (2013.01); *G06F 21/6245* (2013.01); *G06F 21/78* (2013.01)

(58) Field of Classification Search
CPC .......... G06F 21/10; G06F 21/30; G06F 21/31; G06F 21/32; G06F 21/42; G06F 21/44; G06F 21/60; G06F 21/6245; G06F 21/6254; G06F 2221/2111; H04L 63/0478; H04L 63/0492; H04L 63/107; H04L 63/18; H04L 9/14; H04L 9/32; H04L 9/3215; H04L 9/3226; H04L 9/3231

See application file for complete search history.

(56) References Cited

U.S. PATENT DOCUMENTS

| | | | |
|---|---|---|---|
| 5,960,080 A | 9/1999 | Fahlman et al. | |
| 7,159,039 B1 * | 1/2007 | Hahn | G06Q 10/107 709/202 |
| 7,987,511 B2 | 7/2011 | Brown et al. | |
| 8,195,939 B2 | 6/2012 | Reinart et al. | |
| 8,510,398 B2 | 8/2013 | Yasrebi et al. | |
| 9,727,748 B1 * | 8/2017 | Yaeger | G06F 21/6218 |
| 2002/0026487 A1 | 2/2002 | Ogilvie et al. | |
| 2002/0178365 A1 | 11/2002 | Yamaguchi | |
| 2003/0131057 A1 * | 7/2003 | Basson | G06F 17/248 709/206 |
| 2004/0078595 A1 * | 4/2004 | Kent, Jr. | G06Q 10/107 713/160 |
| 2004/0078596 A1 | 4/2004 | Kent et al. | |

(Continued)

*Primary Examiner* — Eric W Shepperd

(57) ABSTRACT

The example embodiments are directed to an application and a system capable of identifying levels of secure data within electronic message content. In one example, the method includes at least one of: receiving an electronic message from a user device, the electronic message including message content and at least one recipient, determining that the message content includes a plurality of different levels of secure content corresponding to a plurality of different authentication levels, shielding each portion of the secure content, and providing an indicator indicating a level of authentication associated with each respective shielded portion of secure content from among the plurality of different levels of authentication, and transmitting the electronic message to the at least one recipient including the shielded secure content and the indications of the plurality of different levels of authentication.

17 Claims, 11 Drawing Sheets

(56) References Cited

U.S. PATENT DOCUMENTS

| | | | |
|---|---|---|---|
| 2005/0138109 A1* | 6/2005 | Redlich | G06F 21/554 709/201 |
| 2005/0278620 A1 | 12/2005 | Baldwin et al. | |
| 2006/0053285 A1* | 3/2006 | Kimmel | H04L 63/0428 713/166 |
| 2006/0075228 A1 | 4/2006 | Black et al. | |
| 2006/0242558 A1* | 10/2006 | Racovolis | G06F 17/24 715/205 |
| 2006/0277220 A1* | 12/2006 | Patrick | G06F 21/6218 |
| 2008/0162603 A1* | 7/2008 | Garg | G06F 17/218 |
| 2009/0025063 A1* | 1/2009 | Thomas | G06F 21/6218 726/4 |
| 2010/0138658 A1 | 6/2010 | Logue et al. | |
| 2010/0229246 A1* | 9/2010 | Warrington | G06F 21/6218 726/28 |
| 2010/0275021 A1 | 10/2010 | Kristiansen et al. | |
| 2010/0313239 A1* | 12/2010 | Chakra | G06F 21/6218 726/2 |
| 2011/0113109 A1 | 5/2011 | LeVasseur et al. | |
| 2011/0119361 A1* | 5/2011 | Issa | G06Q 30/02 709/223 |
| 2011/0247081 A1* | 10/2011 | Shelton | G06F 21/6218 726/28 |
| 2012/0137373 A1* | 5/2012 | Miseldine | G06F 21/6227 726/28 |
| 2012/0254986 A1* | 10/2012 | Levien | G06F 21/31 726/17 |
| 2012/0331571 A1* | 12/2012 | Vandervort | G06F 21/6209 726/30 |
| 2013/0036478 A1 | 2/2013 | Davis et al. | |
| 2013/0268357 A1 | 10/2013 | Heath | |
| 2013/0324081 A1* | 12/2013 | Gargi | H04M 1/67 455/411 |
| 2013/0333018 A1 | 12/2013 | Doukhvalov et al. | |
| 2014/0201527 A1 | 7/2014 | Krivorot | |
| 2014/0208445 A1 | 7/2014 | DeLuca et al. | |
| 2014/0280261 A1 | 9/2014 | Butler et al. | |
| 2014/0314232 A1 | 10/2014 | Fahrny et al. | |
| 2015/0046711 A1* | 2/2015 | Slaby | H04L 63/08 713/170 |
| 2015/0082391 A1 | 3/2015 | Lerman et al. | |
| 2015/0150091 A1 | 5/2015 | Bruce et al. | |
| 2015/0205975 A1 | 7/2015 | Agrawal et al. | |
| 2015/0381567 A1 | 12/2015 | Johnson et al. | |
| 2016/0142501 A1 | 5/2016 | Herger et al. | |
| 2016/0241530 A1 | 8/2016 | Andreev et al. | |

\* cited by examiner

AndroidManifest
<receiver android:name="com.AEDesign.communication.WifiReceiver" >
  <intent-filter android:priority="100">
    <action android:name="android.net.wifi.STATE_CHANGE" />
  </intent-filter>
</receiver>
BroadcastReceiver class
public class WifiReceiver extends BroadcastReceiver {

@Override
  public void onReceive(Context context, Intent intent) {

NetworkInfo info = intent.getParcelableExtra(WifiManager.EXTRA_NETWORK_INFO);
    if(info != null && info.isConnected()) {
      // Device is connected to Wifi
    }
    else {
      // the device is no longer connected to the network
      String timestamp = DateFormat.getDateTimeInstance().format(new Date());
    }
  }
}

Permissions
<uses-permission android:name="android.permission.ACCESS_WIFI_STATE"/>
<uses-permission android:name="android.permission.ACCESS_NETWORK_STATE"/>
```

651 points to the `else` block.

US 10,521,610 B1

DELIVERING SECURE CONTENT IN AN UNSECURE ENVIRONMENT

CROSS REFERENCE TO RELATED APPLICATION(S)

This application claims priority to U.S. Provisional Patent Application No. 62/347,131, filed on Jun. 8, 2016, in the United States Patent and Trademark Office, which is hereby incorporated by reference in its entirety.

BACKGROUND

As mobile devices and personal computers become more powerful, the amount and frequency of electronic messages (e.g., email, instant message, text message, etc.) continues to expand. At present, electronic messages may be sent from and delivered to a user just about anywhere because users typically carry a network accessible device (e.g., mobile phone, laptop, tablet, etc.) with them at all times and also have access to the Internet through home networks, work networks, cellular networks, hotspots, and the like. In addition, most modern smartphones come with built-in email clients, text, and instant messaging services making it possible for users to begin sending messages via multiple channels without having to search for, download or install software related thereto.

In a typical electronic messaging system, once an electronic message has been sent it is not possible for a sender to modify the text content, attachments, or recipients included within the message, because the message has left the control of the senders messaging service and is on the way to (or has already been delivered to and received by) the recipient's messaging service. Recently, some messaging systems have begun offering a special recall feature that allows messages to be recalled. However, the recall feature requires the sender to be quick on their feet and initiate the recall almost immediately from when the message is sent (e.g., within a few seconds). Furthermore, the recall feature merely removes the message but does not provide for modifying content included within the message. As a result, a user must generate a new message and forego the original message. Therefore, what is needed is a system and method capable of modifying content included within an outgoing electronic message.

SUMMARY

In one example embodiment, provided is a method of a secure data server, the method including receiving, via a network, a request for secure information from a user device, analyzing a network connection of the user device and detecting that the network connection is an unsecure network connection, and, in response to detecting the unsecure network connection, generating a response to the request, identifying secure content included in the response and remaining content that is not secure content, and transmitting the response to the user device comprising the remaining content with the secure content being omitted.

In another example embodiment, provided is a secure data server including a network interface configured to receive, via a network, a request for secure information from a user device, and a processor configured to analyze a network connection of the user device, and detect that the network connection is an unsecure network connection, wherein in response to detecting the unsecure network connection, the processor is further configured to generate a response to the request, identify secure content included in the response and remaining content that is not secure content, and control the network interface to transmit the response to the user device comprising the remaining content with the secure content omitted.

In another example embodiment, provided is a method including receiving an electronic message from a user device, the electronic message comprising message content and at least one recipient, determining that the message content comprises a plurality of different levels of secure content corresponding to a plurality of different authentication levels, shielding each portion of the secure content, and providing an indicator indicating a level of authentication associated with each respective shielded portion of secure content from among the plurality of different levels of authentication, and transmitting the electronic message to the at least one recipient comprising the shielded secure content and the indications of the plurality of different levels of authentication.

In another example embodiment, provided is a computing device including a network interface configured to receive an electronic message from a user device, the electronic message comprising message content and at least one recipient, and a processor configured to determine that the message content comprises a plurality of different levels of secure content corresponding to a plurality of different authentication levels, shield each portion of the secure content, and provide an indicator indicating a level of authentication associated with each respective shielded portion of secure content from among the plurality of different levels of authentication, wherein the processor is further configured to control the network interface to transmit the electronic message to the at least one recipient comprising the shielded secure content and the indications of the plurality of different levels of authentication.

BRIEF DESCRIPTION OF THE DRAWINGS

For a proper understanding of the example embodiments provided herein, reference should be made to the accompanying figures. It should be appreciated that the figures depict only some embodiments of the invention and are not limiting of the scope of the invention.

FIG. 6B is a diagram illustrating code for determining whether a device has a current network connection according to an embodiment.

DETAILED DESCRIPTION OF THE EMBODIMENTS

Figure 1:
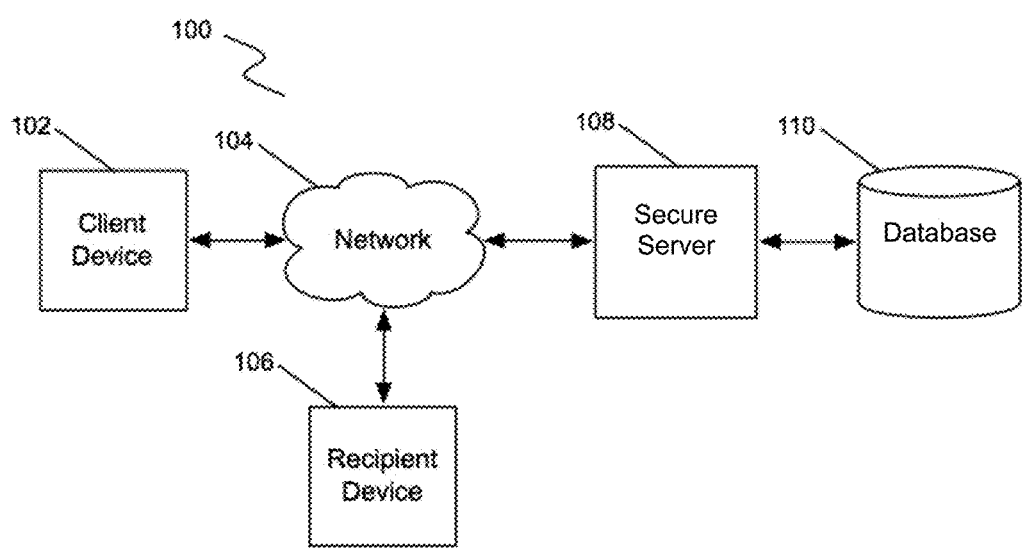
FIG. 1 is a diagram illustrating a system for delivering secure content according to an embodiment.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification does not necessarily refer to the same group of embodiments, and the described features, structures, or characteristics may be combined in any suitable manner in one or more embodiments.

Embodiments herein are directed to a system and method for delivering secure content included in an electronic message, for example, secure content included within and associated with an email, an instant message, a text message, a Social Messaging Service (SMS) message, and the like. In various aspects, a sender device transmits a request for secure content to a server such as a data server or a message delivery server. In response, the secure server may detect that the sender device is connected through an unsecure network connection and is therefore not a secure device. Accordingly, the server may deliver unsecure content or generic content to the sender with the secure content removed. Furthermore, the remaining secured content may be sent to a secure device that is associated with the sender such as a device connected to the server via a dedicated connection such as a virtual private network (VPN) or the like. The unsecure content that is delivered to the sender may still provide the sender with an answer to the request such that the sender can understand the general concept of the answer, but with specific secure details being withheld such as sensitive financial information, project information, and/or the like.

Embodiments herein are also directed to a system and method for transmitting secure content having different levels of security corresponding to different authentication levels or methods. For example, the server may receive a message from a sender and determine that the message content includes a plurality of different levels of secure content corresponding to a plurality of different authentication levels. The server may shield each portion of secure content while also provide a graphical indicator such as text, symbols, colors, etc. indicating a level of security and a corresponding level of authentication required for revealing the shielded content. Furthermore, the server may transmit the electronic message to at least one recipient including the shielded secure content and the indications of the plurality of different levels of authentication associated therewith.

FIG. 1 illustrates a system 100 for delivery secure content according to an embodiment. Referring to FIG. 1, the system 100 includes a client device 102, a recipient device 106, a secure server 108, a database 110, and a network 104 connecting one or more of the devices of the system 100. For example, the client device 102 may be used by a sender of an electronic message and may include a computer, a laptop, a tablet, a smart phone, a smart wearable device, an appliance, a gaming system, a kiosk, and the like. According to various embodiments, the client device 102 may have software or code stored and executed thereon which routes outgoing electronic messages or requests such as emails, texts, instant messages, and the like, to the secure server 108 via the network 104. In addition, another portion of the application (or all of the application) may be installed and executed at the secure server 108 and may be used to generate a response to the request received from the client device 102 and determine where to delivery secure content included in the response.

As a non-limiting example, the application may be included in both the client device 102 and the secure server 108 and may be part of a messaging client, an email client, a text message client, or the like, that is installed on the client device 102 and the secure server 108. However, the examples are not limited thereto. As another example, the software application may reside solely on the client device 102, solely on the secure server 108, or on another device. In addition, the application described herein may reside completely or partially on any one of the other elements in the system depicted in FIG. 1; for example, the network 104.

The client device 102 may be connected to the network 104 (which may be the Internet or any other type of network) through wired or wireless communication. It should be noted that other types of devices, in addition to client devices 102, might be included within the system 100. For example, a PDA, an MP3 player or any other wireless device, a gaming device (such as a hand held system or home based system) and the like (including a PC or other wired device) that can transmit and receive information may be included.

A user of the application may interface with the client device 102 and connect through the network 104 to the secure server 108. Through this connection, the client device 102 may transmit requests to the secure server 108 and receive responses from the secure server 108. Although not shown in FIG. 1, the client device 102 may be owned and/or operated by a user who also operates a secure device. The secure server 108 may be redundant, may be more than a single entity, and the like. The database 110 may be directly coupled or externally connected to the secure server 108 or connected remotely through the network 104 without deviating from the scope of the application. In some examples, the secure server 108 and/or the database 110 may be deployed with a cloud platform. It should be appreciated that client device 102 may also reside on a user's desktop computer, a personal digital assistant (PDA), tablet computer, or any other device containing a processor, memory, and functional software such as an operating system.

The application may be downloaded through a platform (such as an application store or market) residing on the client device 102 or accessed via the device, or may be accessed through the device's browser communicably coupled to the network 104. Further, the application may be pre-loaded on the client device 102 or automatically loaded based on the location of the device, attributes of the user and/or of the device, and the like. The software application described herein is compatible with any device such as a personal computer, a laptop, a personal computing tablet, a smartphone, a PDA, a smart watch, smart glasses or any device with a processor and memory.

In FIG. 1, the recipient device 106, which may be a plurality of recipient devices, is connected via a wired or wireless connection to the network 104 and may communicate with the client device 102 via the network 104. The recipient device 106 may receive an outgoing message originating from the client device 102 and being routed directly to the recipient device 106 or through one or more intermediary devices such as the secure server 108. The recipient device 106 may correspond to a recipient included within a TO field of the electronic message originating from the client device 102 and being modified based on the software application described herein. For example, a modified electronic message may be modified by the application stored on the client device 102 and/or the secure server 108, and transmitted to recipient device 106. As another example, the recipient device 106 may correspond to a recipient not included in an electronic message origination from a sender, but that is added by the application described herein which is stored on the client device 102 or the secure server 108. For example, the recipient device 106 may correspond to a secure device that is associated with the client device 102. Here, the secure device may have a more secure connection to network 104 such as through a virtual private network, an intranet, a specific Wi-Fi connection, and the like.

The example embodiments are directed to data and messages in general, such as email, instant message, text message, SMS message, or any other type of electronic message data being sent out. The message may be intended for one recipient or multiple recipients and the message may contain a body of textual content as well as other data such as images and files, one or more attachments which may be part of the message, one or more photos in the body of the message, an appended media file such as a photography file, and the like.

In an embodiment, provided herein is a system and method that provides sensitive data to devices that are considered secure in nature, and does not provide sensitive data to devices that are unsecure, for example, devices connected via a public network. An overall flow of the method may include a request that is made from an unsecure, personal device to a secure server. In response, the secure server provides a response to the unsecure personal device that only includes non-secure information. In addition, a secure connection may be made between the secure server and a secure device/account associated with the unsecure, personal device. For example, the secure device may be a work-related device/account, a device connected to the network via an intranet, a device connected to a particular organization's Wi-Fi, and the like. Once established, the secure server sends the secure data to the secure personal device.

As an example, a user of the unsecure device may request a status of a personal topic of interest. For example, the request may inquire about the status of financial information such as an offer currently being made for another corporation. This request may be sent to, and received by the secure server. In response, the secure server may perform various actions including sending back an unsecure message to the user, responding to the user's question without providing any secure data, establishing a secure connection between the secure server and a secure device/account, and sending a part of or the entire response (including secure data) to the user's secure device/account.

Figure 2:
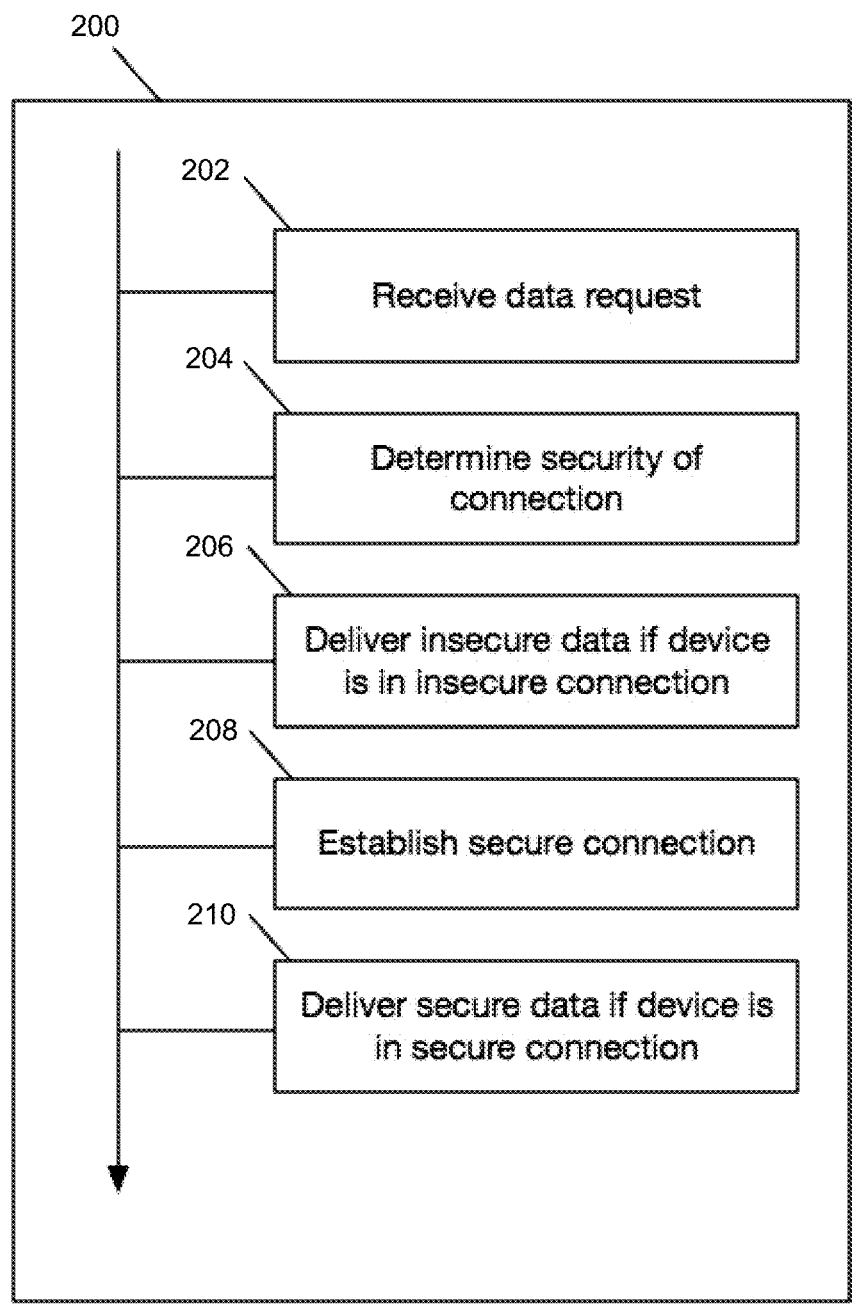
FIG. 2 is a diagram illustrating a method of delivering secure data to a secure device according to an embodiment.

FIG. 2 illustrates a method 200 of delivering secure data to a secure device according to an embodiment. FIG. 2 illustrates an example of an implementation of the application described herein. In 202, a request for data is received by a device such as the secure server 108 shown in FIG. 1. In an alternate embodiment, data is not received from a recipient but rather automatically provided to the server, the database coupled thereto, or any other component including a processor and memory, when a particular action occurs. For example, a particular action may include a location of a user device, an action performed by or on a user device, an action occurring on or by one or more components within the network, etc. In response, in 204 the server analyzes a type of connection of the requesting device to determine how secure the device is. For example, the following code may be used to determine a type of network connection and whether the device is connected to Wi-Fi, for example.

```
Reachability *reachability=[Reachability reachabilityForInternetConnection];
[reachability startNotifier];
NetworkStatus status=[reachability currentReachabilityStatus];
If (status==NotReachable)
{
    //No internet
}
else if (status==ReachableViaWiFi)
{
    //WiFi
}
else if (status==ReachableViaWWAN)
{
    //3G
}
```

If the type of connection is unsecure then the data that is considered general in nature may be delivered to the device in 206 while the secure data may be omitted or otherwise prohibited from being delivered. The server then seeks a secure connection with another device that is associated with the same user, in 208, and if a secure connection is able to be established, the secure data is delivered in 210. Here, only the secure data may be transmitted or in the alternative, the entire response may be transmitted including both the secure data and the unsecure data.

Figure 3:
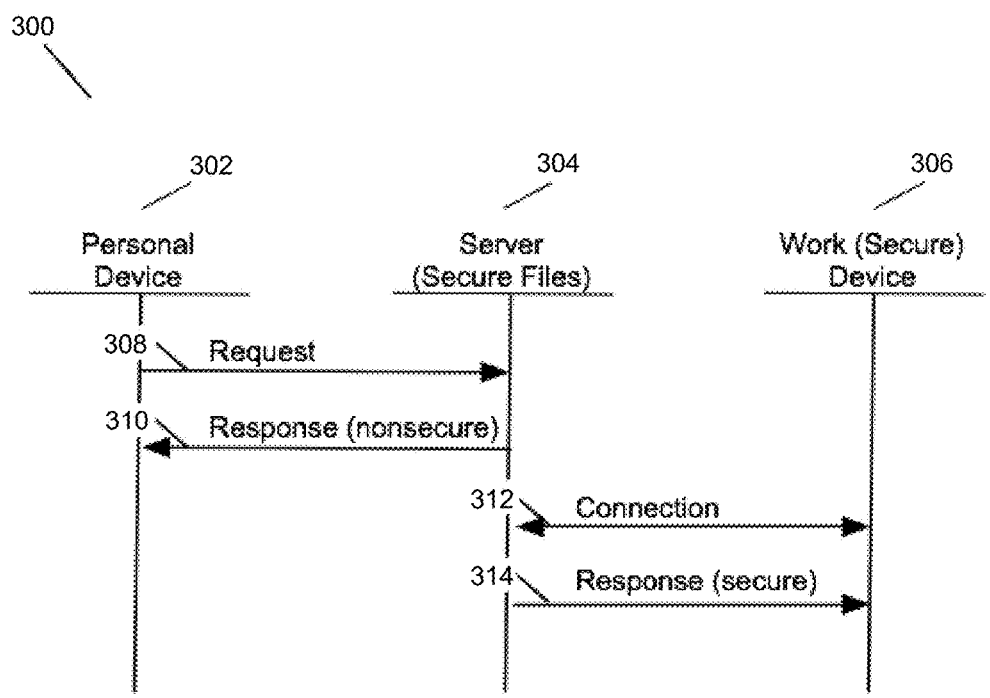
FIG. 3 is a sequence diagram illustrating a method of delivering secure content according to an embodiment.

FIG. 3 illustrates a sequence 300 of delivering secure content according to an embodiment. FIG. 3 depicts an example in which a non-secure device requests information and the secure server containing the secure information sends back a response to the non-secure device. Also, the secure server establishes a secure connection with another device of the user, a secure device, and sends all of the data (secure and non-secure data) to the secure device.

Referring to FIG. 3, a user utilizing client device 302 requests information from the server in 308. In this example, the client device 302 is not in a secure environment and is deemed an unsecure device. For example, the client device 302 may be connected to an unsecure Wi-Fi network, a cellular network connection, and/or the like. This request may originate from an application executing on the client device, or may be part of the installed operating system of the client device 302. A request message 308 is sent from the unsecure device and routed (for example through a network 104) to a server 304. This routing may also be through a network such as the Internet.

According to various embodiments, the server 304, examining the data received in the request message, determines that the request is made through a non-secure device, and responds back to the non-secure device with a response message in 310, containing no secure information. For example, the server 304 may determine that the connection is from an unsecure device by analyzing the connection made between the device 302 and the server 304, for example.

In 312, the server 304 establishes a connection with a secure device 306 that is associated with the client device 302. For example, the secure device may have a secure network connection such as through a VPN. In this example, the secure device 306 may be associated with the same user of the client device 302, but may be a work device such has a dedicated device considered part of a secure organization, for example. After the connection is established, all data, or the data considered secure in nature, is sent to the secure device in 314.

As an example, the user, utilizing the client device 302 may query the server 304 with the following data:

"What is the status of the purchase?"

In this example, the server may response back with unsecure data only, such as:

"We will be making an offer for a corporation".

That is, the non-secure data is sent to the non-secure device such that a general answer to the query is provided however, no secure data is sent/delivered. Meanwhile, the secure connection has been established with the secure device 306 corresponding to the same user and all data is sent to this device in a message such as:

"We will be making an offer for ABC Corporation Thursday 7/21/2016 for $82 per share."

According to various embodiments, the application described herein may perform additional processing that enables further functionality. In one embodiment, an incoming message may be parsed and stored at the secure server or a remotely connected database. In this example, the data in the message may be converted into searchable tokens utilizing an API such as Java Package: org.apache.lucene-.analysis. This package implements tokenization that includes breaking of input text into small indexing elements or tokens. Once the text is tokenized, the text may be analyzed for repetitious words, apparent categories of subject matter, keywords, phrases, etc., and these elements may be stored locally in the server or remotely such as in the database. For example, the words/phrases may be ranked in level of security in another embodiment, allowing different actions according to the ranking of a security associated with a word/phrase.

In another embodiment, an electronic message may be delivered to a recipient wherein data within the message is shielded from view, yet the message of the data is understood. This shielding may be implemented in one or more of various methods including replacing characters such that a viewer is unable to see the words yet understand that the data is obstructed. As another example, characters may be marked out via a method of marking through the text. As another example, when displaying the text in the message, the characters that are to be hidden may be replaced with other characters, such as a colored box, such that when viewed, the replaced words appear as marked out. As another example, characters may be blurred out in such that the user is able to see characters without being able to read the words.

In some embodiments, there are multiple levels of security established within an electronic message where each level of security requires different types of authentication. In this example, the levels of shielded data may depend on the type of data, the user and/or the current connection of the device.

As indicated above, parsed text may be stored categorically and/or via keywords/phrases. The words/phrases may be ranked according to how important each word or phrase is within the context of the message, and may be hidden from view from a recipient. For example, certain keywords and/or phrases may be predefined within the application or may be identified from a message based on content included within the message.

As another example, characteristics of the recipient may be utilized in determining what text to show and what text to hide from the recipient when presenting a message to the recipient. For example, if a user is outside of the current environment (e.g., outside an area such as a predefined Wi-Fi connection, cellular tower radius, or the like), then it may be beneficial to hide details of the message from the recipients. The type of user may also be ascertained via the characteristics of the recipient's contact information, such as an email address, a cellular phone number, or the like. For example, the recipient may be considered outside of the environment if the domain of the email address is different from the sending domain.

As another example, a current network connection may be used to differentiate between recipients. For example, if the potential recipient is utilizing a protocol that is outside of the current protocol, such as the current Wi-Fi connection, that recipient may be considered outside of a secure environment and thus unable to receive all of the data in the message.

Figure 4:
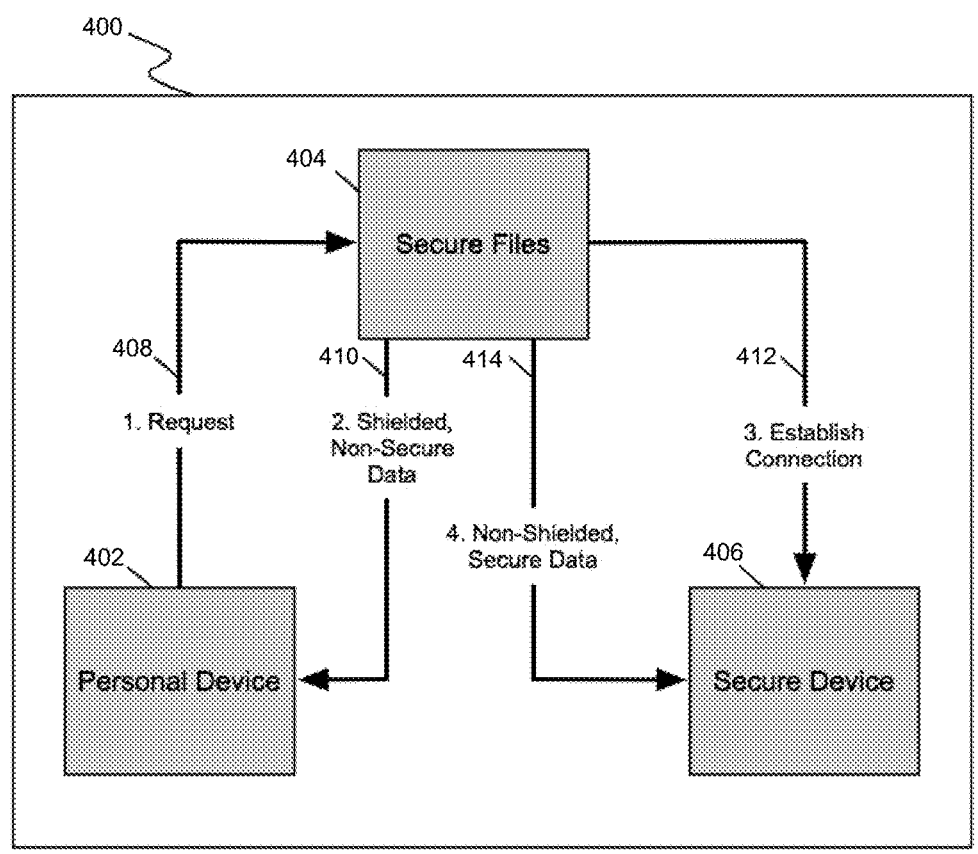
FIG. 4 is a diagram illustrating a process of delivering shielded data according to an embodiment.

FIG. 4 illustrates a process 400 of delivering shielded data according to an embodiment. FIG. 4 illustrates an example of processing a message and delivering shielded non-secure data 410 and non-shielded secure data 414 to different devices associated with a same user. In 408, a request is sent from a user's personal device 402, such as a mobile device or any type of device that is considered unsecured in nature. The personal device 402 may be any device with a processor and memory. According to various embodiments, an unsecured device may be a device that is not connected to a virtual private network (VPN), a device that is not connected to organization's Wi-Fi, or other organization-related network.

The request may be from an application executing on the personal device 402 wherein the user, interacting with the GUI elements of the executing application provides input causing the personal device 402 to issue a request for information to a server 404 storing secure data. For example, the request message may, in one embodiment, contain data that reflects the current security nature of the device. For example, if the personal device 402 has a secure network connection (e.g., connected to a particular Wi-Fi, or connected to an organization's VPN) an indicator of the network connection may be sent with the request message and may be provided through a setting of a field that is included in the message. It is possible, therefore, to determine if the sending device of a request message is secure in nature. However, if the personal device 402 is not secure, then the server 404 handles data delivery to that device by transmitting the secure device to a secure device 406.

In this example, unsecured data may be sent to the personal device 402 as well as data that is shielded from view of a reader. Here, the shielded data may be data that is hidden from view of the reader. However, the reader may still be able to determine the nature of the message without making any secure data visible. In addition, the server 404 may establish a connection 412 with the secure device 406 associated with the same user as the personal device 402. This connection 412 may be secure connection, for example a VPN connection, or any other connection between a server and a device wherein the data transmitted is secure in nature such as through the use of encryption. Furthermore, all of the non-shielded secure data 414 is then sent to the secure device 406 without any shielded data because the shielded data is revealed. For example, the following data may be sent such as shown in the electronic message 500 of FIG. 5:

"We will be making an offer for ABC Corporation on Thursday for $80 per share."

In this example, there exist levels of secure data where different levels of authentication are provided for the reader to be able to view the different levels of secure data, respectively. For example, fewer or greater number of levels of secure data may be implemented without deviating from the scope of the embodiments. The use of two levels of security is provided herein for example purposes only. For example, a first level of secure data may be data that is shielded and secure only when being transmitted to a non-secure device. This data may be sent to a device in an unsecure environment. A second level of secure data may be data that is more secure in nature and is shielded even though the transmission is considered secure or to a device in a secure environment. As one example, the shielding of data may be performed by incorporating GUI components within an electronic message that effectively hide the secure data, but that still support the ability of the reader to gain an overall understanding of the message of the data.

Figure 5:
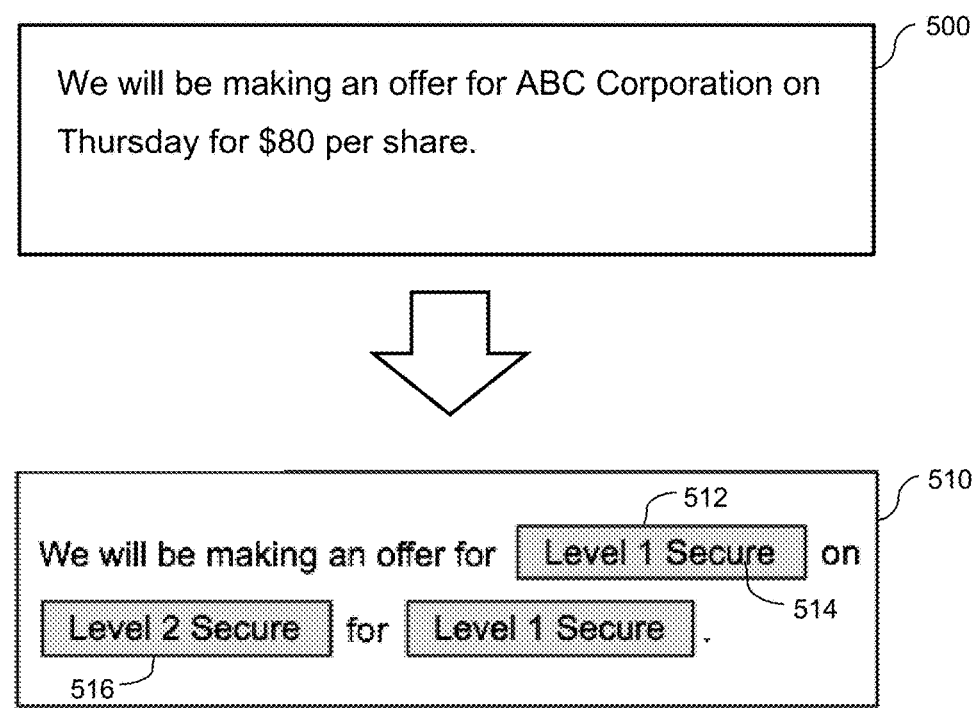
FIG. 5 is a diagram illustrating an electronic message including shielded content and authentication level indicators according to an embodiment.

As a non-limiting example, multiple levels of secure content included in an electronic message may be shielded and presented as shown in the example of FIG. 5. For example, the secure content may be shielded when being sent to the personal device 402 shown in FIG. 4. In this example, the shielded portions of the text are overlaid with a graphical user interface (GUI) component. The GUI component may also include an indicator that specifies the level of security necessary to view the hidden text. Here, an electronic message 510 is delivered to a user of a personal, unsecure device where hidden portions of the message are overlaid with graphical components.

In particular, graphical boxes 512, 516 are used to shield the text underneath, as well as provide an indicator 514 that indicates an authentication level necessary to obtain access to the hidden text. As an example, authenticating of the user may be performed differently for each level of secure data, and may include many different authentication methods, including but not limited to biometrics, keys, etc. In this example, the shielding the text and providing the shielded text via different authentication levels may help authenticate the reader of the message when data is being sent to an unsecure user.

In some examples, the portion of text that is level 2 authentication secure may be sent to a separate device than the portion of text that is level 1 authentication secure is sent. For example, the different levels of secure data may be sent to different devices associated with a same user via text message, email, a voice call, etc., henceforth referred to as the user's second personal device. As an example, the second personal device may be a wearable device, such as a watch or fitness band, headset or a device that places a display in front of the eyes, a second mobile device, or any other device containing a processor and memory. The secondary personal device may also be a device without a display whereby data is presented to the user in another format, for example audio only. For example, in FIG. 5, the text "Thursday" may be sent to a secondary personal device via message (text). The user of the application during an initialization of the application may predefine secondary associated devices.

For the level 1 secure access (i.e. those hidden parts of the message shielded via Level 1 Secure), a first part of the message may be sent to a requesting personal device, and the remaining part of the message may be sent to a secondary device which is a secondary device that is normally utilized by the user. The secondary device may be determined based on its proximity to the requesting device, whether it has been accessed within a predetermined amount of time from which the request is sent from the first device, network movement of the requesting device and the secondary device being the same or similar, and the like.

For example, it may be desirable to send a first message portion to a first personal device and a second remaining message portion to a second device, when both personal devices act accordingly, for example both devices move from a first network to a separate network. A benefit of sending the secure content to multiple devices is that it avoids sending both message parts to incorrect recipients by assuring that both devices move geographic locations together, thus increasing the chance that the devices belong to the same individual.

Referring to FIG. 5 again, for example, the phrase "Thursday" may be sent to a first personal device and the phrases "ABC Corporation" and "$80/share" may be sent to a secondary personal device when both the first personal device and the secondary personal device become disconnected from a network (for example a Wi-Fi network) at the same or similar time.

Figure 6A:
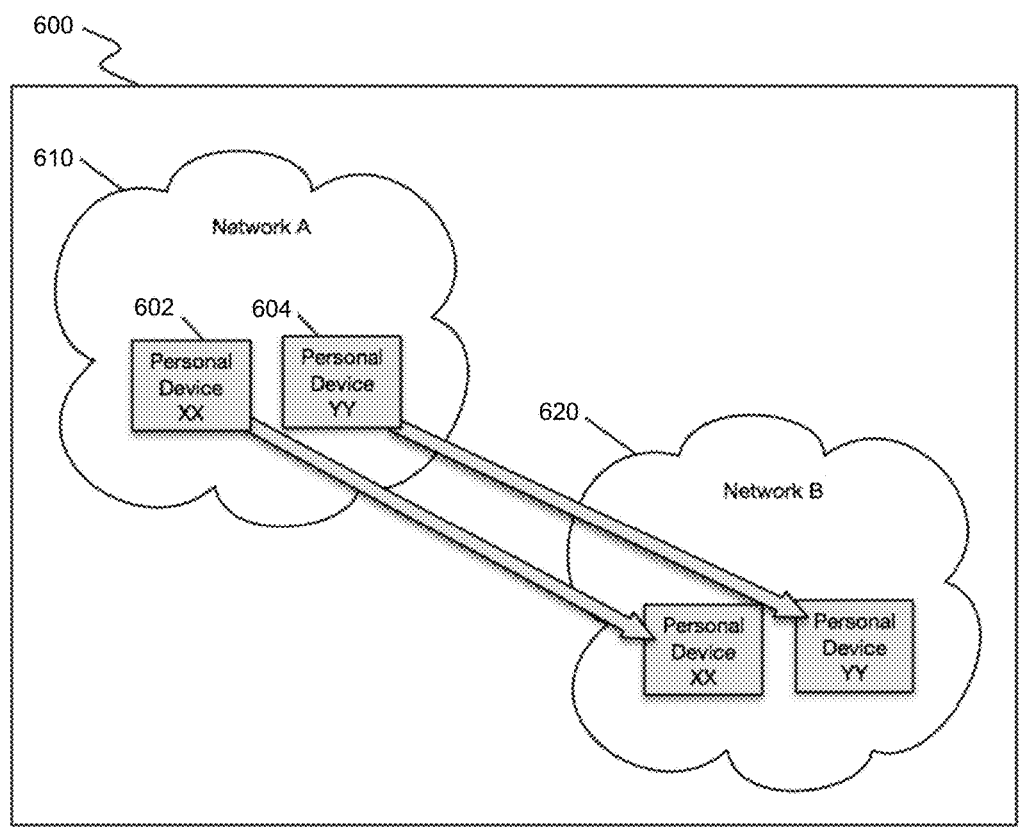
FIG. 6A is a diagram illustrating an example of sending secure content to different devices according to an embodiment.

FIG. 6A illustrates a process 600 of sending secure content to different devices according to an embodiment. Here, FIG. 6 depicts a scenario in which a user of the application has two devices including a personal device XX 602 and a personal device YY 604 and both devices are in Network A 610 and move to Network B 620. For example, the personal devices may be a mobile phone and a wearable device, or two other similar devices. The devices may be utilized in the current embodiment, and each device may be utilized to receive notifications, such as a message. Also, the networks may be any type of network, for example a Wi-Fi network.

In FIG. 6A, different parts of a message are sent to two or more devices associated with the recipient such that the user is able to receive messages on separate devices and understand the complete message by combining both messages once they are received. Here, the sending server may determine that the devices both belong to a same recipient for security purposes. For example, if both devices move from one network (for example Network A 610 to Network B 620 within a predetermined amount of time, then the server may determine that both devices are associated with a same recipient and therefore deliver both parts of a message to each device. In another example, personal device XX 602 and personal device YY 604 may travel from network A 610 to network B 620, and back to network A 610. This further determines that the devices are with the same user as they travel together in and out of networks in a round trip.

As another example, when it is determined that both devices exit a network, for example a Wi-Fi network at the same or similar time, the server may determine that both devices are associated with the same recipient. To determine the time that a given device exits a Wi-Fi network, it is possible to query the connection status of the device. If the device is currently in a connected state, then falls into a disconnecting or disconnected state, the device has therefore either exited the Wi-Fi network, or the device has disabled Wi-Fi network access. Obtaining a timestamp when the device has changed from connected state will therefore record the time that the device no longer has access to that Wi-Fi network.

FIG. 6B illustrates an example of sample code 650 that shows how a device, for example executing the Android operating system, determines the current state of the Wi-Fi connection. Based on executing the code 650, it is possible to check the Wi-Fi connection by using the WifiManager object and casting it into a NetworkInfo object. For example, it may be determined that the Wi-Fi is connected when the isConnected( )method on the NetworkInfo object returns true, and not connected otherwise. If the isConnected( )method on the NetworkInfo object returns false, it is therefore determined that the Wi-Fi is no longer connected 651, and it is then a timestamp may be captured to record the time at which the connection is no longer valid. This timestamp may be compared to other devices of the user and compare the timestamps to determine if the devices lost Wi-Fi connection at the same or similar time.

In some additional embodiments, in order to provide additional security, the system may instruct a user to travel to another geographic location to receive additional data. For example, the system may require the recipient to move to another location that further increases the security, as one seeking to steal information would need to move geographic locations with the user as the data is presented. Here, when the server sends data, the data may be divided into sections such that a first portion of the data is delivered to the recipient along with a notification (either included with the data notification, or a separate notification) informing the user to enter into another geographic location to obtain more data pertaining to the message. This more data may be the remaining part of the original message, or another section of the message. In some embodiments, once the additional or next set of data is delivered, a notification is sent to the device which instructs the user to return to the original location, or yet another location to continue to obtain the next or final data.

In another embodiment, data presented on a device is automatically removed from that device after a predetermined period of time. This period of time may be hardcoded wherein the static value is designed and included into the software executing on the device, or may be configured by the user of the application. The configuration may occur via the user interacting with the current application executing on the client device 102 for example via navigating to a configuration area of the application through a navigation menu where the user may be presented with configuration GUI elements. For example, the user may enter 10 and choose "seconds" in a dropdown component containing "minutes, seconds, etc." for the configuration element:

"Length until message expiration:"_____<dropdown component>

In another embodiment, as the user moves into the next location to obtain additional or final data, the previous delivered data is removed from the device. This further avoids the situation where an entity may be able to steal information as the data is removed from the device.

In these examples, to determine a geographic location, the application may determine networks that are near the geographical location of the current location of the user, in one embodiment. The networks may be adjacent or nearby Wi-Fi networks, intranets that the user may have previously connected to, or any other similar network.

For example, the user may be currently located within a public Wi-Fi network. Data may be sent to a secure server from an originator. The server may divide the data into two portions of sub-data and deliver the first part to the client device 102 currently located in the public network. Furthermore, a notification may be sent to the user's device with the following content:

"To obtain the next part of the data, move to the Wi-Fi network with the ID: G-Starbucks located at 121 West Main Street between 1:15 and 1:17."

In one embodiment, the server may push the data to the recipient for the declared 2 minutes, delivering the data if the device is in the specified network only. As another example, the server may send the data at predetermined times (for example every 20 seconds) or at an interval that is predetermined via the configuration of the application wherein the interval is entered in via GUI components. The data may be received by the application executing on the recipient's device and processed only if the current network matches the next determined network of the server. Included in the messaging of the remaining data may be an element of the next network, for example the SSID of the network to receive the remaining data, which is compared to the current network of the device at its current location. As another example, the server may receive a notification that the device has entered the determined network wherein the remaining parts of the data are sent via messaging. The application sends a message to the server upon connection to the determined network.

Figure 7:
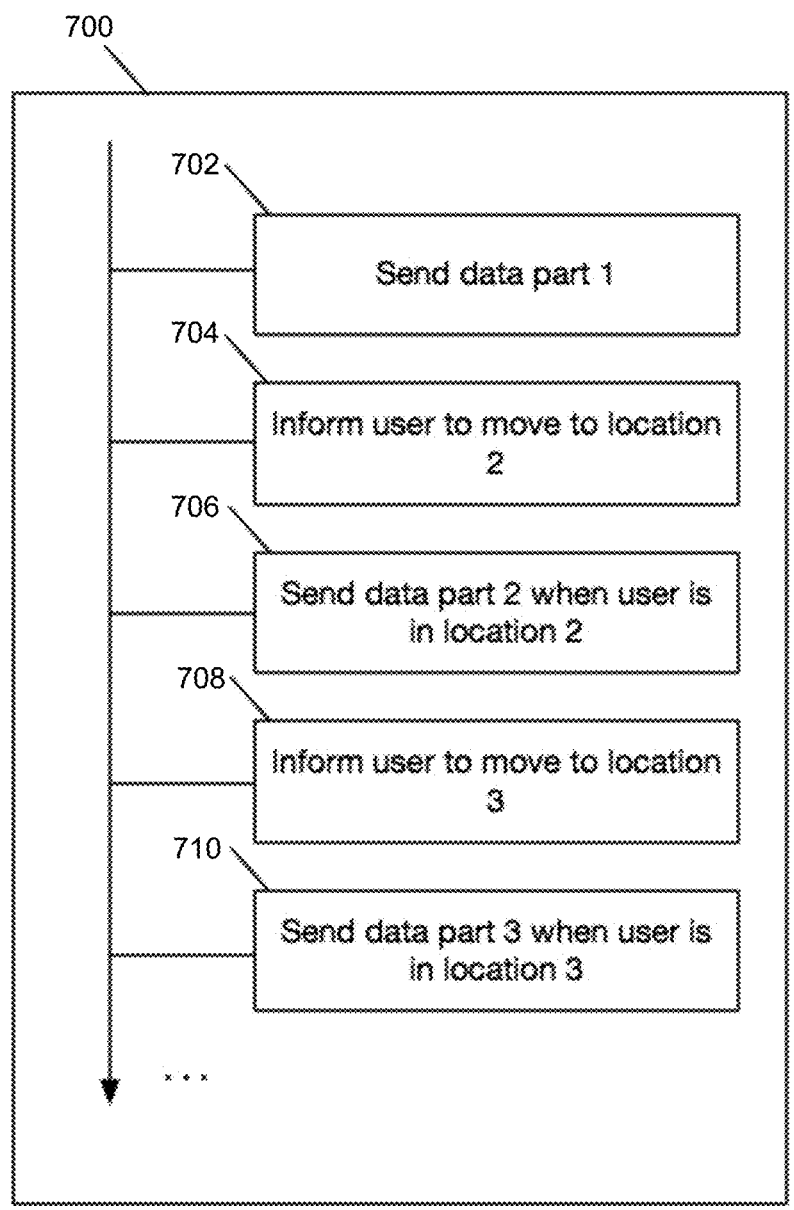
FIG. 7 is a diagram illustrating a method of delivering sequential data according to another embodiment.

FIG. 7 illustrates a method 700 of delivering sequential data according to another embodiment. FIG. 7 represents activity performed by a server, such a secure server 108 wherein the server sends sequential parts of data as a device travels geographically to the instructed next locations. Referring to FIG. 7, in 702 a first section of data is sent to the device of the recipient. The data is sent in a message containing the first part of the data from the server routed through the network to the client device. In 704, a notification may be sent to the recipient while also informing that the next section of data will be delivered when the device moves into a second location, where the second location may be a network such as a Wi-Fi network.

Upon notification that the recipient's device is in the second location, in 706 the second data part is sent to the recipient device. Here, the recipient's device may inform the server of the change of geographic location to the second location upon connection to a network at the second location, for example a Wi-Fi network. In addition, a notification is sent in 708 to the recipient informing that the next section of data will be delivered when the device moves into a third geographic location, where the third location may be a network such as a Wi-Fi network. Accordingly, upon notification that the recipient's device is in the third location, the third data part is sent to the recipient in 710. The recipient's device informs the server of the change to the third location upon connection to a network at the third location, for example a Wi-Fi network. Here, the third location may be the same location as the first location or it may be different. This continues until the full data has been delivered to the recipient.

Figure 8:
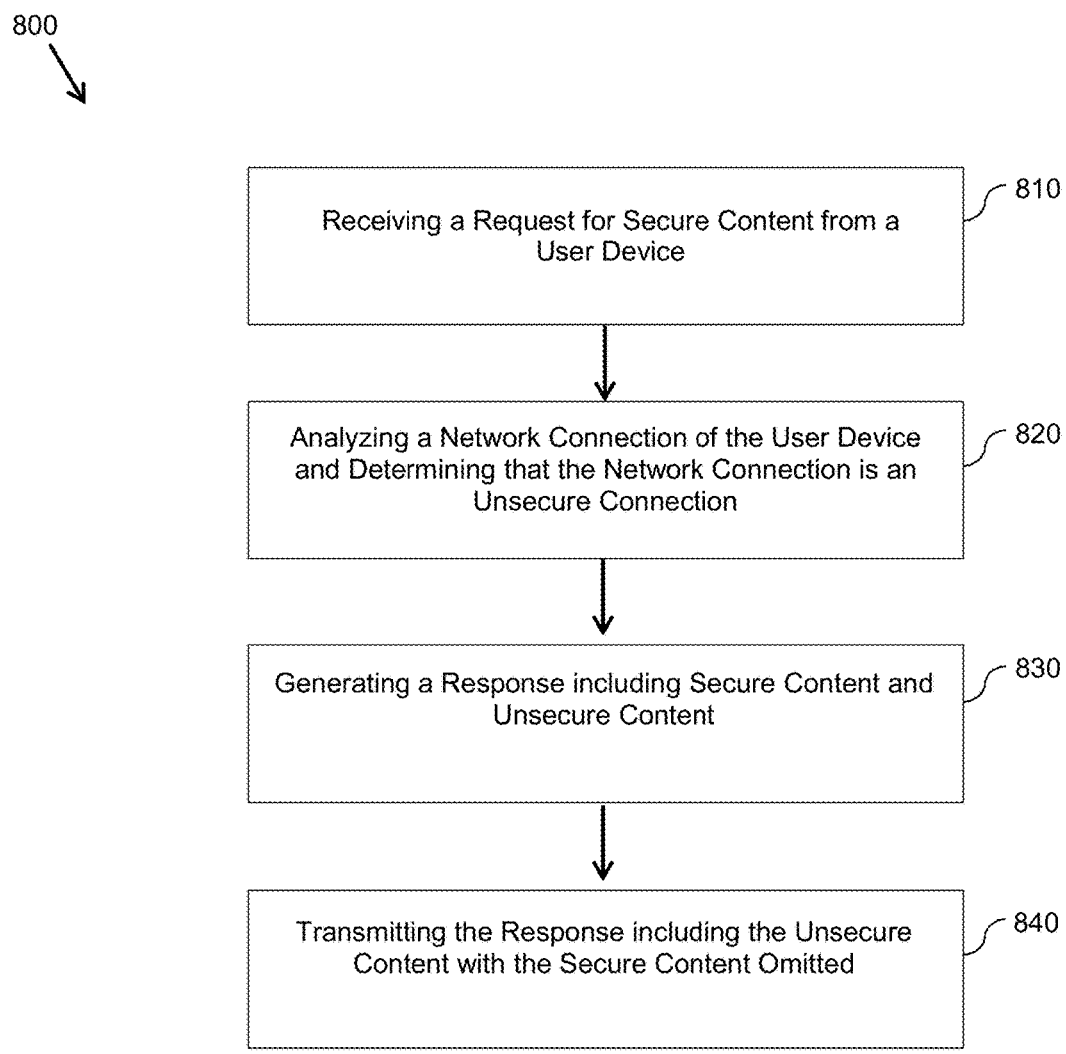
FIG. 8 is a diagram illustrating a method for delivering secure content in an unsecured environment according to an embodiment.

FIG. 8 illustrates a method 800 for delivering secure content in an unsecured environment according to an embodiment. The method 800 may be performed by the secure server 108 shown in FIG. 1, and the like. Referring to FIG. 8, the method 800 includes receiving, via a network, a request for secure content from a user device, in 810. For example, the request may include a text message, an email, an instant message, and the like, including a query or other request for content that is secure in nature. For example, the secure content may include private information of a company or other organization, sensitive financial information, sensitive personal information, and the like. The request may be generated by a messaging application described according to various embodiments that is stored at least partially on the user device.

In 820, the method includes analyzing a network connection of the user device from which the request was received and detecting that the network connection is an unsecure network connection. As an example, the unsecure network connection may be that the user device is connected to a public network, a Wi-Fi network, or some other network that is not deemed secure. In some embodiments, the application as described herein is executing on the user device and inserts an indicator of the network connection into the request that is sent to the secure server. For example, the indicator may indicate a type of network connection such as public, private, home, etc., whether the connection is wired, wireless, etc., a name of the network, whether the network is a virtual private network, and the like. The indicator may be inserted within a field of the request message and may include text, characters, numbers, flags, bits, and the like. Accordingly, the secure server may automatically detect a type of network that the user device is connected to as well as a security level associated with the type of network based on the request.

In response to detecting the user device has the unsecure network connection, the method includes generating a response to the request and identifying secure content included in the response and remaining content that is not secure content, in 830. Furthermore, in 840 the method transmits the response to the user device including the remaining content with the secure content being omitted or otherwise hidden. For example, the response may include an electronic message and the remaining content may include textual content that is included within a body of the electronic message. The omitted content may omitted by removing the content from the message, or it may include content that is blocked out, fuzzed out, blurred, boxed over, shielded, hidden, or the like. According to various embodiments, the remaining content may include textual content answering the request with unsecure content or generic content. For example, the secure content may be replaced with generic content such that the response is capable of being understood by a user as an answer to the request but without the details of the secure content being included.

In response to detecting the user device has the unsecure network connection, the method may further include identifying a secure device that is associated with the user device, establishing a connection with the secure device, and automatically transmitting the omitted secure content of the response to the secure device. The secure device may be a device that is connected to the secure server via a more secure connection than the user device from which the request was received. For example, the secure device may be connected to the secure server via a private network, an intranet, a wireless network associated with the secure server, a virtual private network, and the like. As another example, the secure data server may be associated with an organization, and the identifying the secure device associated with the user device comprises identifying a device that is connected to the organization's network.

Figure 9:
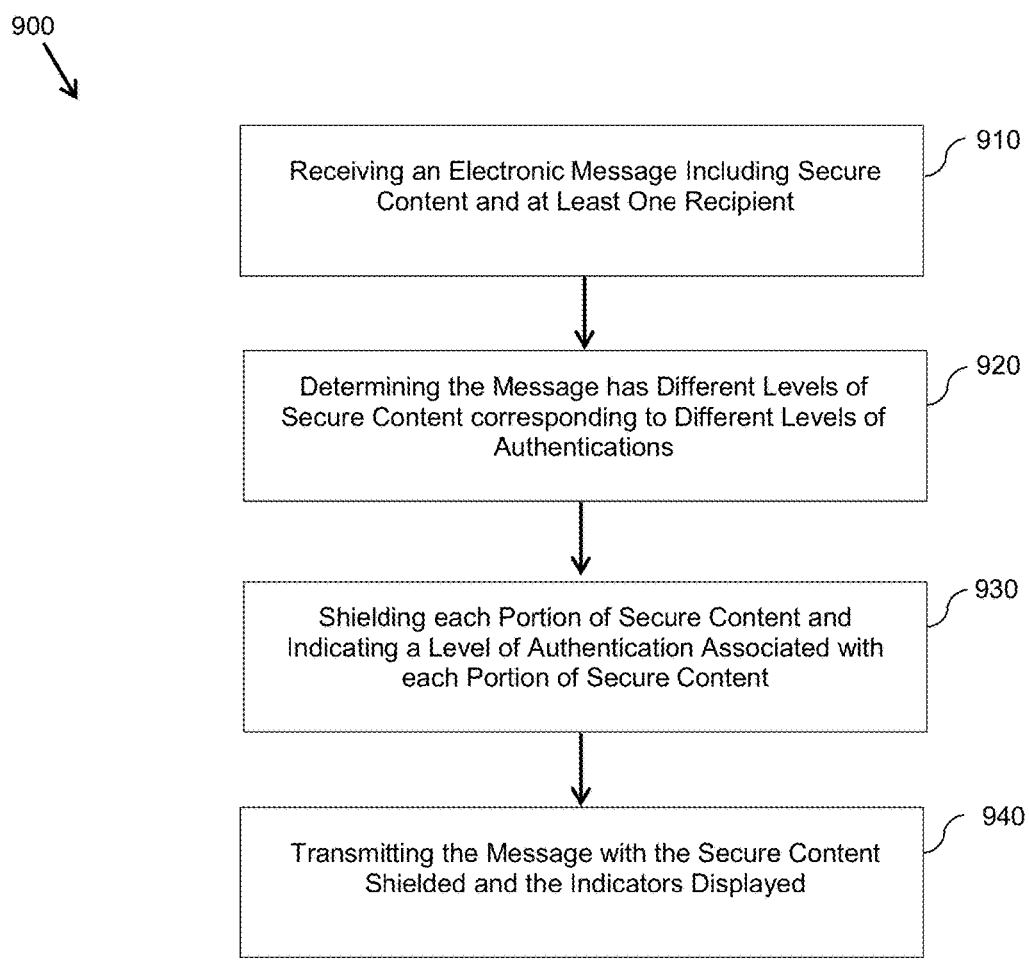
FIG. 9 is a diagram illustrating a method for delivering secure content in an unsecured environment according to another embodiment.

FIG. 9 illustrates a method 900 for delivering secure content in an unsecured environment according to another embodiment. The method 900 may be performed by the secure server 108 shown in FIG. 1, and the like. Referring to FIG. 9, in 910, the method includes receiving an electronic message from a user device that includes message content and at least one recipient. In 920, the method includes determining that the message content comprises a plurality of different levels of secure content corresponding to a plurality of different authentication levels. The determining in 920 may include breaking a body of text included in the electronic message into a plurality of tokens, identifying a subject matter associated with each token, and ranking a level of security of each token based on the subject matter thereof. The plurality of levels of secure content may include at least a first level and a second level. Here, as a non-limiting example, the first level of authentication may require a password authentication and a second level of authentication may require a biometric authentication. As another example, the secure content may be included within an attachment or an image that is attached to the electronic message.

In 930, the method includes shielding each portion of the secure content, and providing an indicator indicating a level of authentication associated with each respective shielded portion of secure content from among the plurality of different levels of authentication. For example, the shielding may include overlaying a graphical user interface (GUI) object on each portion of secure content, and the providing may include adding textual content within each GUI object indicating a level of authentication from among the different levels of authentication associated with the content shielded by the respective GUI object. As another example, the shielding may include blurring out the secure content, marking the secure content, blacking out the secure content, and the like. In this case, the indicator of the authentication level may be provided with color, a type of marking used to shield the content, an additional mark or signal, and the like. Even though secure content is shielded, the reader may still be able to gain an overall understanding of the message content with the secure content being shielded and/or replaced with generic content.

In 940, the method includes transmitting the electronic message to the at least one recipient comprising the shielded secure content and the indications of the plurality of different levels of authentication. For example, the transmitting may include transmitting the secure content associated with the first level to the user device and transmitting the secure content associated with the second level to a second device that is associated with the user device. In some examples, prior to the transmitting, the method may further include determining to transmit to the second device based on network movement of the user device and the second device being similar, based on a proximity of the user device and the second device with respect to each other, and/or the like.

Figure 10:
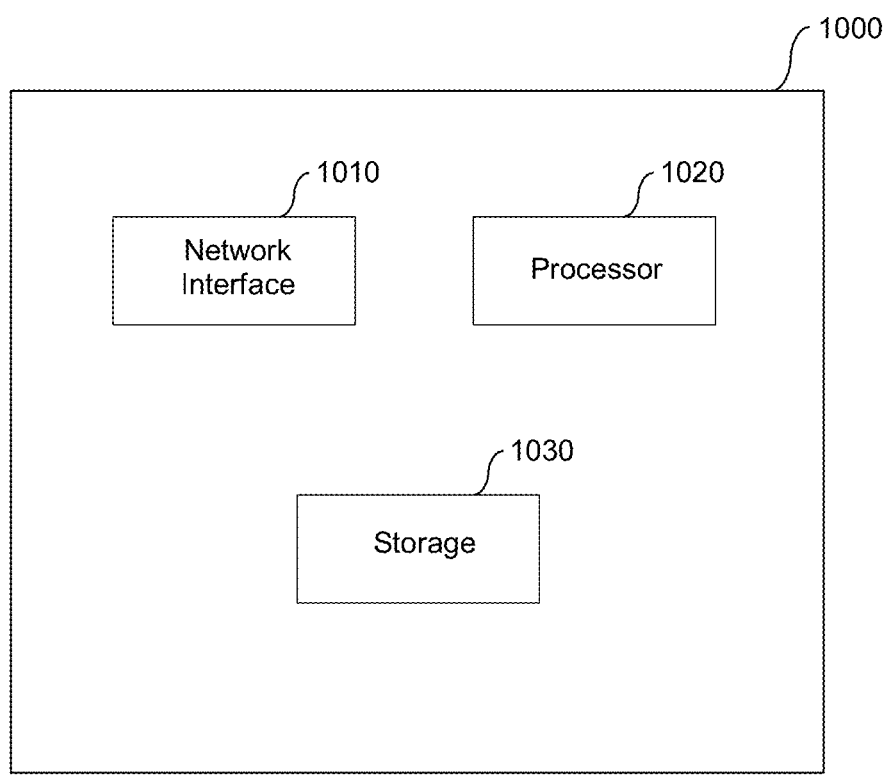
FIG. 10 is a diagram illustrating a computing system for delivering secure content according to an embodiment.

FIG. 10 illustrates a computing system 1000 for delivering secure content according to an embodiment. For example, the computing system 1000 may perform the methods shown in FIGS. 8 and 9. The computing system 1000 may refer to the secure server 108 shown in FIG. 1 or another device and may include a cloud computing system, a server, a user device, and/or the like. In this example, the computing device 1000 includes a network interface 1010, a processor 1020, and a storage 1030. It should also be appreciated that the computing system 1000 may include other components that are not specifically shown such as an output device, one or more input units, a display (embedded or connected externally), and the like.

According to various embodiments, the network interface 1020 may receive, via a network, a request for secure content from a user device. The processor 1020 may analyze a network connection of the user device and determine whether the network connection of the user device is a secure network connection or an unsecure network connection. For example, the processor 1020 may determine that the user device is an unsecure connected device when the user device is connected to the secure data server via a public network, a Wi-Fi network, or any other network lacking security. The processor 1020 may execute a script or a code on the message received from the user device which can determine a type of the network connection of the user device. For example, the request may include an indicator included in a field of the request which indicates that the user device is connected via an unsecure network connection or a secure network connection.

If the user device is determined to be connected to the computing system 1000 through an unsecure network connection, the processor 1020 may generate a response to the request, identify secure content included in the response and remaining content that is not secure content, and control the network interface 1010 to transmit the response to the user device including only the remaining content with the secure content omitted. For example, the response may include an electronic message (e.g., text message, instant message, email, SMS message, etc.) and the remaining content generated by the processor may include textual content that is included within a body of the electronic message. Here, the remaining content generated by the processor 1020 may include textual content answering the received request with secure content being removed and replaced with generic content such that the response is capable of being understood by a user and the user can gain an overall understanding of the response content.

In some embodiments, the processor 1020 may further identify a secure device that is associated with the user device. For example, the secure device may be a device that is co-owned by a same user that owns the user device. The association of the two devices may be previously stored in the storage 1030 or it may be determined based on information included in the request. In response, the processor 1020 may establish a connection with the secure device, and automatically transmit the omitted secure content of the response to the secure device. Accordingly, the non-secure content may be transmitted to the user device while the secure content is transmitted to a separate device that is more secure than the user device. Here, the processor 1020 may identify the secure device associated with the user device by identifying a device that is connected to the secure data server via a VPN. As another example, the computing system 1000 may be associated with an organization, and the processor 1020 may identify the secure device associated with the user device by identifying a device that is connected to the organization's internal network, Wi-Fi network, private network, intranet, or the like.

According to another embodiment, the network interface 1020 may receive an electronic message from a user device that includes message content and at least one recipient. The electronic message may be sent from a sender and may include multiple levels of secure content included therein. The processor 1020 may determine that the message content includes a plurality of different levels of secure content corresponding to a plurality of different authentication levels. For example, the processor 1020 may break a body of text included in the electronic message into a plurality of tokens, identify a subject matter associated with each token, and rank a level of security of each token based on the subject matter thereof. For example, the plurality of levels of secure content may include at least a first level and a second level that correspond to first and second levels of authentication. The first level of authentication may require a password authentication and the second level of authentication may require a biometric authentication.

The processor 1020 may shield each portion of the secure content, and provide an indicator indicating a level of authentication associated with each respective shielded portion of secure content from among the plurality of different levels of authentication. For example, the processor 1020 may overlay a GUI object on each portion of secure content, and add textual content within each GUI object indicating a level of authentication from among the different levels of authentication associated with the respective GUI object. The processor 1020 may shield an amount of secure content and/or replace shielded content such that a reader still has an ability to gain an overall understanding of the message content.

The processor 1020 may control the network interface 1010 to transmit the electronic message to the at least one recipient including the shielded secure content and the indications of the plurality of different levels of authentication. For example, the processor 1020 may control the network interface 1010 to transmit the secure content associated with the first level to the user device and transmit the secure content associated with the second level to a second device that is associated with the user device. Here, the processor 1020 may determine to transmit a portion of the message content to the second device based on network movement of the user device and the second device being similar, a proximity of the user device and the second device with respect to each other, and the like.

The above-described examples of the disclosure may be implemented using computer programming or engineering techniques including computer software, firmware, hardware or any combination or subset thereof. Any such resulting program, having computer-readable code, may be embodied or provided within one or more computer-readable media, thereby making a computer program product, i.e., an article of manufacture, according to the discussed examples of the disclosure. For example, the computer-readable media may be, but is not limited to, a fixed drive, diskette, optical disk, magnetic tape, flash memory, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

An exemplary storage medium may be coupled to the processor such that the processor may read information from, and write information to, the storage medium. In the alternative, the storage medium may be integral to the processor. The processor and the storage medium may reside in an application specific integrated circuit (ASIC). In the alternative, the processor and the storage medium may reside as discrete components, for example a network element, which may represent network components.

Although an exemplary example of the system, method, and computer readable medium of the present disclosure has been illustrated in the accompanied drawings and described in the foregoing detailed description, it may be understood that the disclosure is not limited to the examples disclosed, and is capable of numerous rearrangements, modifications, and substitutions without departing from the spirit or scope of the disclosure as set forth and defined by the following claims. For example, the capabilities of the systems may be performed by one or more of the modules or components described herein or in a distributed architecture. For example, the functionality performed by the individual modules, may be performed by one or more of these modules. Further, the functionality described herein may be performed at various times and in relation to various events, internal or external to the modules or components. Also, the information sent between various modules may be sent between the modules via at least one of: a data network, the Internet, a voice network, an Internet Protocol network, a wireless device, a wired device and/or via plurality of protocols. Also, the messages sent or received by module and may be sent or received directly and/or via one or more of the other modules.

While preferred examples of the present application have been described, it is to be understood that the examples described are illustrative only and the scope of the application is to be defined solely by the appended claims when considered with a full range of equivalents and modifications (e.g., protocols, hardware devices, software platforms etc.) thereto.

The invention claimed is:

1. A method comprising:
receiving an electronic message from a user device, the electronic message comprising message content and at least one recipient;
identifying, in the electronic message, a plurality of message portions as secure content;
identifying an authentication level, of one or more of a plurality of different authentication levels, corresponding to each message portion, of the plurality of message portions;
shielding the secure content by obscuring information contained in the secure content based on a corresponding authentication level;
associating an indicator indicating an authentication level associated with each respective shielded portion of secure content; and
transmitting the electronic message, including the shielded secure content and the indicators of the plurality of different levels of authentication, to a device associated with the at least one recipient to display, on a display of the device, the shielded content and the indicators.

2. The method of claim 1, wherein the shielding comprises:
overlaying a graphical user interface (GUI) object on each portion of secure content; and
generating the indicator by:
adding textual content within each GUI object indicating a level of authentication from among the different levels of authentication associated with the respective GUI object.

3. The method of claim 1, wherein the identifying the plurality of message portions as secure content comprises:
breaking a body of text included in the electronic message into a plurality of tokens,
identifying a subject matter associated with each token, and
ranking a level of security of each token based on the subject matter thereof.

4. The method of claim 1, wherein a first level of authentication of secure content comprises:
a password authentication and a second level of authentication of secure content requires a biometric authentication.

5. The method of claim 1, wherein the transmitting comprises:
transmitting the secure content associated with a first authentication level to the user device, and
transmitting the secure content associated with a second authentication level to a second device that is associated with the user device.

6. The method of claim 5, further comprising, prior to the transmitting:
identifying the second device based on network movement of the user device.

7. The method of claim 6, further comprising, prior to the transmitting:
identifying the second device based on a proximity of the user device and the second device with respect to each other.

8. A computing device comprising:
a network interface configured to receive an electronic message from a user device, the electronic message comprising message content and at least one recipient; and
a processor configured to:
identify, in the electronic message, a plurality of message portions as secure content;
identify an authentication level, of one or more of a plurality of different authentication levels, corresponding to each message portion, of the plurality of message portions, and
associate an indicator indicating an authentication level associated with each respective shielded portion of secure content,
wherein the processor is further configured to control the network interface to transmit the electronic message, including the shielded secure content and the indicators of the plurality of different levels of authentication, to a device associated with the at least one recipient to display, on a display of the device, the shielded content and the indicators.

9. The computing device of claim 8, wherein the processor is configured to:
overlay a graphical user interface (GUI) object on each portion of secure content, and
generate the indicator by adding textual content within each GUI object indicating a level of authentication from among the different levels of authentication associated with the respective GUI object.

10. The computing device of claim 8, wherein, when the processor is configured to identify the plurality of message portions as secure content, the processor is configured to:
- break a body of text included in the electronic message into a plurality of tokens,
- identify a subject matter associated with each token, and
- rank a level of security of each token based on the subject matter thereof.

11. The computing device of claim 8, wherein a first level of authentication of secure content comprises:
- a password authentication and a second level of authentication of secure content requires a biometric authentication.

12. The computing device of claim 8, wherein
the processor is configured to control the network interface to:
- transmit the secure content associated with a first authentication level to the user device, and
- transmit the secure content associated with a second authentication level to a second device that is associated with the user device.

13. The computing device of claim 12, wherein the processor is further configured to:
- identify the second device based on network movement of the user device and the second device being similar.

14. The computing device of claim 12, wherein the processor is further configured to:
- identify the second device based on a proximity of the user device and the second device with respect to each other.

15. A non-transitory computer readable medium storing instructions that when executed by a processor causes the processor to perform a method comprising:
- receiving an electronic message from a user device, the electronic message comprising message content and at least one recipient;
- identifying, in the electronic message, a plurality of message portions as secure content;
- identifying an authentication level, of one or more of a plurality of different authentication levels, corresponding to each message portion, of the plurality of message portions;
- shielding the secure content by obscuring information contained in the secure content based on a corresponding authentication level;
- associating an indicator indicating an authentication level associated with each respective shielded portion of secure content; and
- transmitting the electronic message, including the shielded secure content and the indicators of the plurality of different levels of authentication, to a device associated with the at least one recipient to display, on a display of the device, the shielded content and the indicators.

16. The non-transitory computer readable medium of claim 15, wherein the shielding comprises:
- overlaying a graphical user interface (GUI) object on each portion of secure content; and
- generating the indicator by:
- adding textual content within each GUI object indicating a level of authentication from among the different levels of authentication associated with the respective GUI object.

17. The non-transitory computer readable medium of claim 15, wherein the
identifying the plurality of message portions as secure content comprises:
- breaking a body of text included in the electronic message into a plurality of tokens,
- identifying a subject matter associated with each token, and
- ranking a level of security of each token based on the subject matter thereof.

* * * * *